INVENTORS
HEINZ KRÄMER
DIETER MESSNER

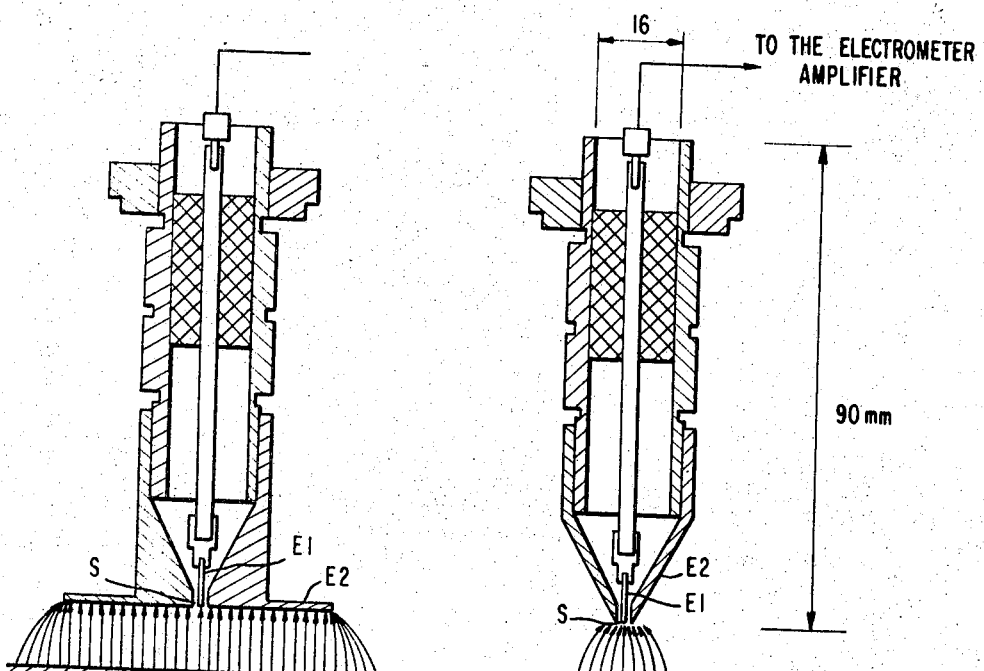
FIG.1a  FIG.1b
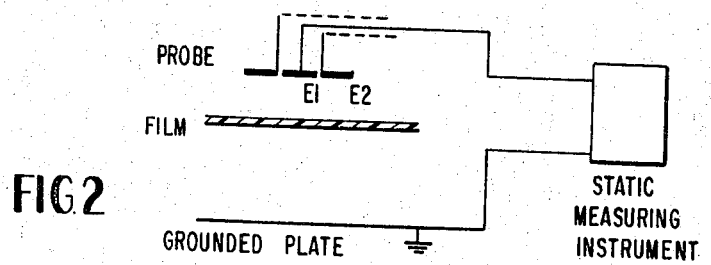
FIG.2
FIG.3
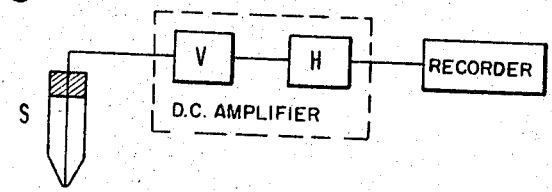
INVENTORS
HEINZ KRÄMER
DIETER MESSNER

United States Patent Office 3,443,224
Patented May 6, 1969

3,443,224
MEASURING PROBE FOR DETERMINING THE DISTRIBUTION OF ELECTROSTATIC CHARGES ON THE SURFACE OF A SOLID BODY
Heinz Krämer and Dieter Messner, Wiesbaden-Biebrich, Germany, assignors to Kalle Aktiengesellschaft, Wiesbaden-Biebrich, Germany, a corporation of Germany
Filed Dec. 6, 1965, Ser. No. 511,768
Claims priority, application Germany, Dec. 8, 1964, K 54,739
Int. Cl. G01r 31/02
U.S. Cl. 324—72.5          7 Claims

ABSTRACT OF THE DISCLOSURE

A measuring probe includes a measuring electrode means surrounded by a screening electrode means. The gap between the measuring electrode means and the screening electrode means is substantially smaller than the smallest diameter of the measuring electrode means, and the measuring electrode means has a surface area adapted to face the surface to be measured not in excess of 1 mm.$^2$.

---

Figure 4:
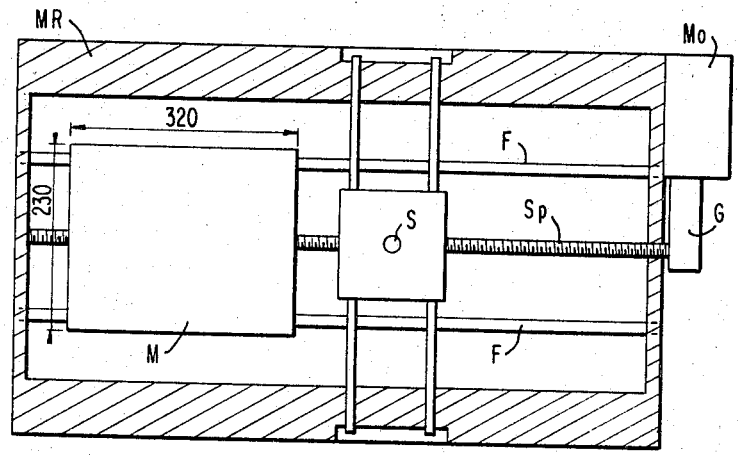

The present invention relates to a highly resolving electrostatic measuring probe which is suitable for determining the local charge distribution on the surface of a solid body.

Instruments for measuring an electrostatic charge on the surface of a solid body are known in the art which, however, do not permit accurate measurements of the charge distribution because of the considerable size of the probe. Some instruments use rotating electrodes, cutouts in a grounded plate being periodically covered in order to produce an alternating voltage. The diameter of such electrodes generally can not be maintained below 5–10 cm.

In another known device, the measuring probe consists of an ionization chamber in which a beam of ions is supplied from a radioactive source. In these cases also, the inlet opening for the lines of flux has a diameter of several centimeters.

Using such equipment, elements having only comparatively large surface area can be measured, the charge distribution on the surface being averaged. An exact profile of the surface to be measured can not be obtained with the hitherto known conventional measuring methods since the construction of such instrumnts does not permit the measuring electrode to be sufficiently small for the accurate measurement of the charge distribution on the surface.

The present invention provides a highly resolving electrostatic measuring probe which is suitable for determining the local charge distribution on the surface of a solid body.

The measuring probe of the present invention comprises a measuring electrode and a screening electrode. The screening electrode surrounds the fixed measuring electrode in a manner such that the width of the gap between the former and the latter is maintained small, compared with the measurements of the measuring electrode.

The surface of the measuring electrode facing the surface to be measured should not be more than 1 mm.$^2$ and preferably should be circular or quadratic. The surface also may have the form of a rectangle or an ellipse, the lengths of the sides of the rectangle or the lengths of the semiaxes of the ellipse not being substantially different from each other. A measuring electrode with a measuring surface of 0.6 mm.$^2$ has proved to be particularly suitable. With still smaller measuring electrodes, the susceptibility to interference is considerably increased, which results from the fact that the gap width between the measuring elecrode and the screening electrode must be small compared with the measurements of the measuring electrode. When the gap width decreases, the measuring electrode and the screening lectrode easily may be short-circuited by dust particles. If necessary, this may be avoided by constantly maintaining a slight overpressure in the interior of the measuring instrument so that through the gap between the measuring electrode and the screening electrode, an air stream is steadily passed from the inside to the outside; care must be taken, of course, that the air in the interior of the measuring instrument is free from dust. By means of such additional devices, it is possible to make the measuring electrode even smaller than 0.6 mm.$^2$.

The width of the gap between the measuring electrode and the screening electrode should be 20% at the most, preferably 10% at the most, of the smallest diameter of the measuring electrode.

Figure 5A:
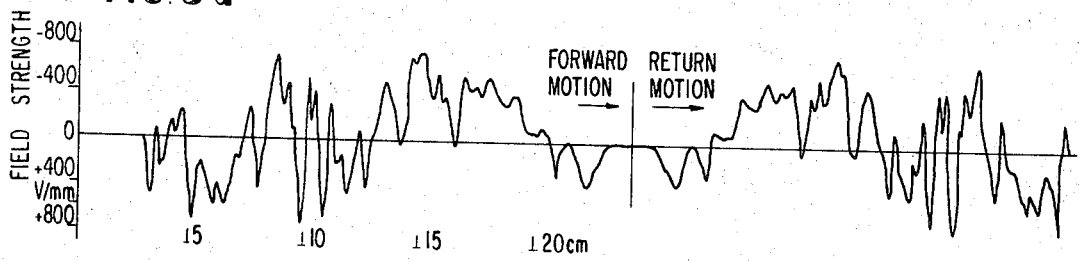
Figure 5B:
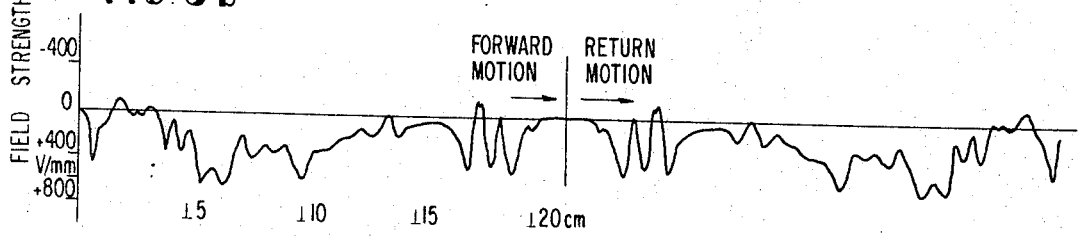
Figure 5C:
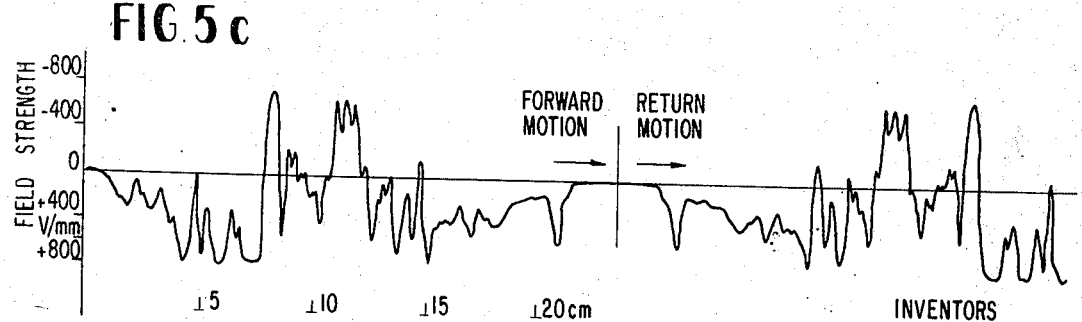

The measuring principle and the construction of the measuring probe are further illustrated in the accompanying drawings in which:

FIGURES 1a and 1b are sectional views showing the internal construction of the two embodiments of the measuring probe of the present inventiton, FIGURE 2 is a diagrammatic representation of the measuring arrangement, FIGURE 3 is a schematic block diagram of the equipment, FIGURE 4 is a diagrammatic representation of a measuring instrument into which the measuring probe can be incorporated, and FIGURES 5a–c show some examples of charge profiles measured with the measuring probe of the present invention.

As shown in FIGURE 1b, the screening electrode E2 may be, for example, a conical envelope surrounding the measuring electrode and being tapered towards the end of the measuring electrode E1. Particularly suitable, however, is to form the screening electrode E2 in the shape of a capacitor guard ring, as shown in FIGURE 1a, which surrounds the measuring electrode as a planar, annular surface. Such a guard ring insures that the lines of flux on the surface to be measured issue vertically and run parallel to each other so that the measuring electrode is met only by the lines of flux which issue from the surface element below it. In this case, it is possible to determine the corresponding field strengths from the measured potential values. The resolving power of the measuring instrument depends upon the size of the measuring electrode E1 and also upon the distance between the measuring electrode and the surface to be measured. The resolving power decreases with an increase in the distance between the measuring electrode and the object to be measured.

According to the diagrammatic measuring arrangement of FIGURE 2, the surface to be measured, e.g. a plastic film, is positioned between a grounded plate and the measuring probe of the present invention, the grounded plate and the probe being connected to an electrostatic measuring instrument. For connecting the measuring probe and the static measuring instrument, a special screened cable which is insensitive to movement is used.

The equipment used with the measuring instrument of the present invention is shown in the schematic block diagram of FIGURE 3. By means of a special screened cable which is insensitive to movement, the measuring electrode is connected with a suitable D.C. amplifier V+H. Recording of the charge measurements is effected in known manner by means of a recorder R.

The complete equipment shown in FIGURE 4 includes the grounded plate M which can be passed below the probe S by means of the spindle drive Sp. The measuring sensitivity of the equipment can be considerably increased if the charged body to be tested (e.g. a plastic film) is not placed directly on the measuring plate M but is clamped into a frame and passed as a free self-supporting body between the measuring plate M and the measuring electrode E1. The measuring plate M slides on the guide bars F and is driven by the motor Mo and the transmission G. The entire equipment is positioned in the interior of the mounting frame MR. The distance between the object to be measured, e.g. a film, and the grounded base plate M may be 2 cm., for example.

For calibrating the instrument, a metal foil is clamped in instead of the object to be measured, the foil being capable of being charged to a predetermined variable potential. The measuring probe, in this case, has the same distance from the metal foil as later when the charged plastic surfaces are measured.

FIGURES 5a to 5c represent three examples of measurements on plastic films. They illustrate the charge profiles measured on films of polyethylene terephthalate, acetyl cellulose and polypropylene, respectively. The charge was generated by rubbing with a cloth.

In order to test the reproducibility of the measurements, the diagrams were produced during both the forward and the return motion of the measuring body. From FIGURES 5a to 5c it can be seen that completely identical charge profiles are obtained. It thus can be shown that the measurement curve does not result from statistical scattering but represents a true charge profile.

Due to the calibration measurements, the measured values may be indicated directly as field strength units. The diagrams illustrated thus represent the course of the field strength as a function of the locus coordinate X. Since the field strength is in functional relationship to the density of the surface charge, each of these diagrams also represents a measurement of the distribution of the surface charge.

The measurement curve shows that the films exhibit very non-uniform charge distributions which can not be determined by the hitherto known measuring methods.

In a manner analogous to that of the measuring examples, the charge distribution on thin semi-conductor layers coated onto paper or films also may be determined by means of the highly resolving measuring instrument of the present invention.

In this manner, the coating quality of the material may be controlled, for example. When being charged, non-uniform thicknesses of the layer become apparent in non-uniform charge distributions which can be determined by means of the measuring probe. This method is important, for instance, when testing electrophotographic papers.

It will be obvious to those skilled in the art that many modifications may be made within the scope of the present invention without departing from the spirit thereof, and the invention includes all such modifications.

What is claimed is:

1. A measuring probe for determining the local distribution of electrostatic charges on a surface while the probe is spaced from such surface, which comprises measuring electrode means surrounded by screening electrode means, the gap between the measuring electrode means and the screening electrode means being substantially smaller than the smallest diameter of the measuring electrode means, the measuring electrode means having a surface area, adapted to face the surface to be measured, not in excess of 1 mm.²

2. A measuring probe according to claim 1 in which the measuring electrode means has a circular surface to face the surface to be measured, not in excess of 0.6 mm.²

3. A measuring probe according to claim 1 in which the measuring electrode means has a circular surface adapted to face the surface to be measured.

4. A measuring probe according to claim 1 in which the measuring electrode means has a square surface adapted to face the surface to be measured.

5. A measuring probe according to claim 1 in which the width of the gap between the measuring electrode means and the screening electrode means is at most 20% of the smallest diameter of the measuring electrode means.

6. A measuring probe according to claim 1 in which the width of the gap between the measuring electrode means and the screening electrode means is at most 10% of the smallest diameter of the measuring electrode means.

7. A measuring probe according to claim 1 in which the screening electrode means has the form of a capacitor guard ring.

References Cited

UNITED STATES PATENTS 2,750,562    6/1956    Starr _____ 324—72.5 XR

RUDOLPH V. ROLINEC, *Primary Examiner.*

E. L. STOLARUN, *Assistant Examiner.*

U.S. Cl. X.R.

324—32